United States Patent
Li et al.

(10) Patent No.: US 12,511,407 B2
(45) Date of Patent: Dec. 30, 2025

(54) METHODS AND MECHANISMS FOR SECURE DATA SHARING

(71) Applicant: Applied Materials, Inc., Santa Clara, CA (US)

(72) Inventors: Fei Li, Houston, TX (US); Jimmy Iskandar, Fremont, CA (US); Michael D. Armacost, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 188 days.

(21) Appl. No.: 18/209,821

(22) Filed: Jun. 14, 2023

(65) Prior Publication Data

US 2024/0419813 A1    Dec. 19, 2024

(51) Int. Cl.
*G06F 21/60* (2013.01)
*G06F 21/62* (2013.01)
*H04L 9/08* (2006.01)

(52) U.S. Cl.
CPC ........ *G06F 21/602* (2013.01); *G06F 21/6218* (2013.01); *H04L 9/0825* (2013.01)

(58) Field of Classification Search
CPC ............... G06F 21/602; G06F 21/6218; G06F 21/6254; H04L 9/0825
See application file for complete search history.

(56) References Cited

U.S. PATENT DOCUMENTS

| | | | |
|---|---|---|---|
| 2014/0304519 A1* | 10/2014 | Gorecki | H04L 9/0825 713/176 |
| 2018/0205707 A1* | 7/2018 | Bellala | H04L 9/085 |
| 2019/0050591 A1 | 2/2019 | Rane et al. | |
| 2022/0058289 A1* | 2/2022 | Beardsworth | G06F 21/6245 |
| 2022/0335142 A1* | 10/2022 | De Soto | H04L 67/02 |
| 2024/0022418 A1* | 1/2024 | Hawkins | H04L 9/14 |

FOREIGN PATENT DOCUMENTS

CN    116112185 A    5/2023

OTHER PUBLICATIONS

International Search Report and Written Opinion for International Application No. PCT/US2024/033673, mailed Sep. 26, 2024, 10 Pages.

* cited by examiner

*Primary Examiner* — Abiy Getachew
(74) *Attorney, Agent, or Firm* — Lowenstein Sandler LLP

(57) ABSTRACT

An electronic device manufacturing system configured to receive, by a first computing system, a request for manufacturing process data request. The system further uses a first cryptographic key controlled by a first entity and a second cryptographic key controlled by a second entity, a database management system to retrieve the manufacturing process data from a data store. The system further obtains, using the database management system, the manufacturing process data stored in the data store. The manufacturing process data is encrypted. The system further sends the encrypted manufacturing process data to a second computing system configured to perform one or more anonymization operations on the manufacturing process data.

20 Claims, 12 Drawing Sheets

| Key Name 510 | Key Type 520 | Key Owner 530 |
|---|---|---|
| Administrator Key | Symmetric Key | First Entity |
| Database Management System Key | Public Key | Second Entity |
| Database Management System Key | Private Key | Second Entity |
| Database Management System Key | Symmetric Private Key | First Entity |
| Data Store Key | Public Key | Second Entity |
| Data Store Key | Private Key | Third Entity |
| Application Key | Public Key | Second Entity |
| Application Key | Private Key | Second Entity |

METHODS AND MECHANISMS FOR SECURE DATA SHARING

TECHNICAL FIELD

The present disclosure relates to electrical components, and, more particularly, to methods and mechanisms for secure data sharing at a manufacturing system.

BACKGROUND

Products can be produced by performing one or more manufacturing processes using manufacturing equipment. For example, semiconductor manufacturing equipment can be used to produce semiconductor devices (e.g., substrates) via semiconductor manufacturing processes. The manufacturing equipment can, according to a process recipe and via a process tool, deposit multiple layers of film on the surface of the substrate and can perform an etch process to form the intricate pattern in the deposited film. For example, the manufacturing equipment can perform a chemical vapor deposition (CVD) process to deposit alternative layers on the substrate. Sensors can be used to determine manufacturing parameters of the manufacturing equipment during the manufacturing processes and metrology equipment can be used to determine property data of the products that were produced by the manufacturing equipment, such as the overall thickness of the layers on the substrate.

Tool data (from process tools) can be collected through, for example, Data Collection Plans (DCPs). In some systems, multiple different algorithms and machine learning models can use the tool data for particular purposes, such as data analytics, predictive operations, and corrective operations.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, an electronic device manufacturing system configured to receive, by a processor of a first computing system, a request for manufacturing process data. The processor further decrypts, using a first key, a database management system configured to retrieve data from a data store. The first key is managed by a first entity. The processor further decrypts, using a second key, the database management system. The second key is managed by a second entity. The processor further retrieves the manufacturing process data from the data store, wherein the manufacturing process data is encrypted. The processor further sends the encrypted manufacturing process data to a second computing system configured to perform one or more anonymization operations on the manufacturing process data.

In another aspect of the disclosure, an electronic device manufacturing system configured to receive, by a processor of a first computing system, a request for manufacturing process data. The system further requests, using a first cryptographic key controlled by a first entity and a second cryptographic key controlled by a second entity, a database management system to retrieve manufacturing process data from a data store. The system further obtains, using the database management system, the manufacturing process data stored in the data store. The manufacturing process data is encrypted. The system further sends the encrypted manufacturing process data to a second computing system configured to perform one or more anonymization operations on the manufacturing process data.

In another aspect of the disclosure, an electronic device manufacturing system configured to receive, by a processor of a first computing system, first encrypted data from a second computing system and receive second encrypted data from a third computing system. The system is further configured to obtain first decrypted data by decrypting, using a first key, the first encrypted data. The first key is part of a first public-private key pair managed by the second computing system. The system is further configured to obtain second decrypted data by decrypting, using a second key, the second encrypted data. The second key is part of a second public-private key pair managed by the third computing system. The system is further configured to obtain output data by performing one or more anonymization operations with respect to the first decrypted data and the second decrypted data. The system is further configured to encrypt the output data using a third key and send the encrypted output data to at least one of the second computing system or the third computing system.

A further aspect of the disclosure includes a method according to any aspect or implementation described herein.

A further aspect of the disclosure includes a non-transitory computer-readable storage medium comprising instructions that, when executed by a processing device operatively coupled to a memory, performs operations according to any aspect or implementation described herein.

BRIEF DESCRIPTION OF THE DRAWINGS

The present disclosure is illustrated by way of example, and not by way of limitation in the figures of the accompanying drawings.

FIG. 5 is a table illustrating an illustrative example of cryptographic key relationships, in accordance with some implementations of the present disclosure.

DETAILED DESCRIPTION

Figure 1:
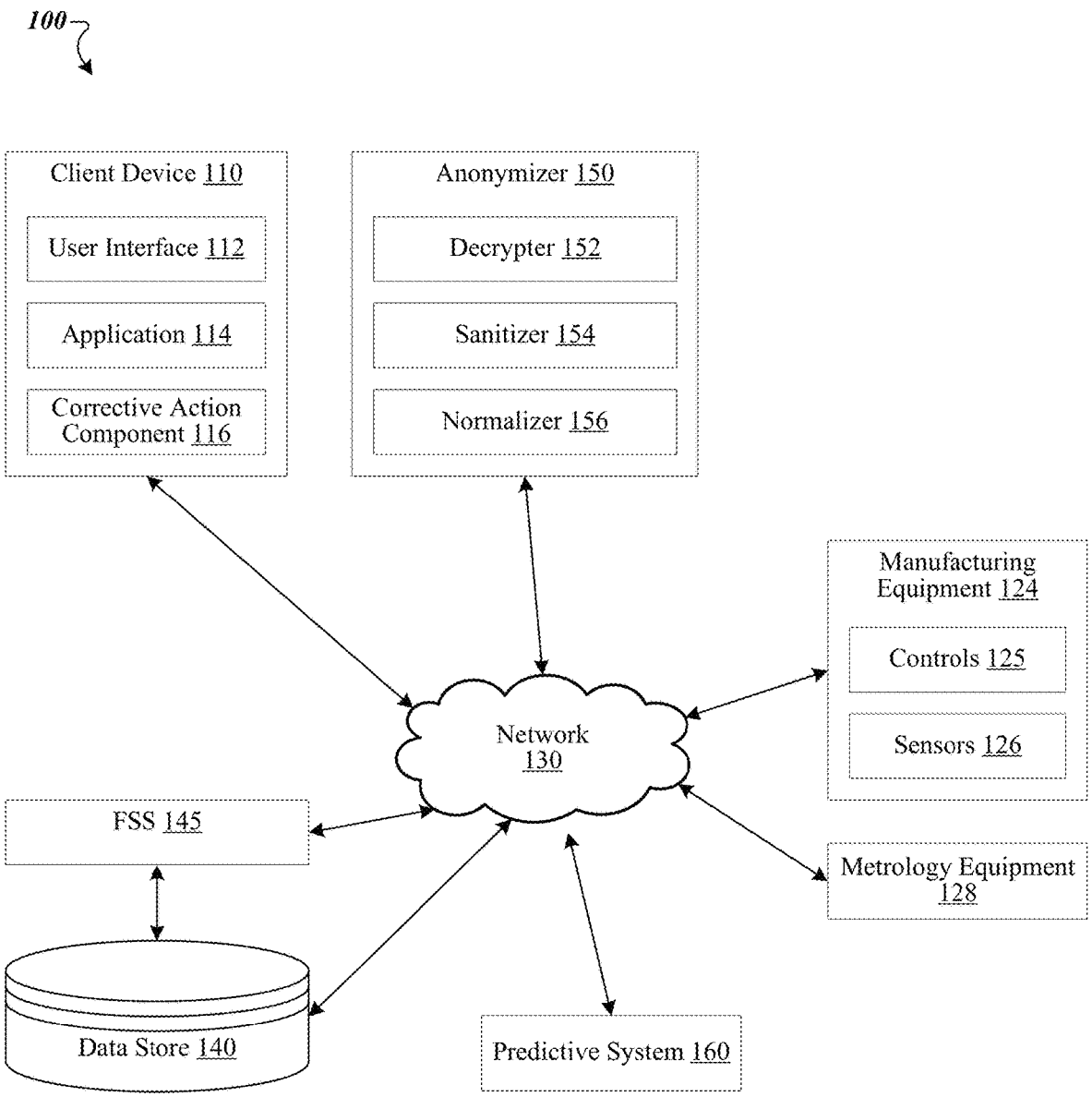
FIG. 1 is a block diagram illustrating an example system architecture, in accordance with some implementations of the present disclosure.

Described herein are technologies directed to methods and mechanisms for secure data sharing at a manufacturing system. A manufacturing system can include multiple process chambers. A process chamber can have multiple sub-systems operating during each substrate manufacturing process (e.g., the deposition process, the etch process, the polishing process, etc.). A sub-system can be characterized as a set of sensors and controls related with an operational parameter of the process chamber. An operational parameter can be a temperature, a flow rate, a pressure, and so forth. In an example, a pressure sub-system can be characterized by one or more sensors measuring the gas flow, the chamber pressure, the control valve angle, the foreline (vacuum line between pumps) pressure, the pump speed, and so forth. Accordingly, the process chamber can include a pressure sub-system, a flow sub-system, a temperature subsystem, and so forth.

A process chamber can perform each substrate manufacturing process according to a process recipe. A process recipe defines a particular set of operations to be performed for the substrate during the process and can include one or more settings associated with each operation. A process recipe can be embodied as a table of recipe settings including a set of inputs or recipe parameters ("parameters") and processes that are manually entered by a user (e.g., process engineer) to achieve a set of target properties (e.g., on-substrate characteristics), also referred to as a set of goals. For example, a deposition process recipe can include a temperature setting for the process chamber, a pressure setting for the process chamber, a flow rate setting for a precursor for a material included in the film deposited on the substrate surface, etc. Accordingly, the thickness of each film layer, the depth of each etch, and so forth, can be correlated to these process chamber settings.

The manufacturing system can collect the system data for maintenance, analytics, and predictive technologies performed by one or more evaluation systems (e.g., machine learning models, inference engines, heuristics models, algorithms, physics-based engine, etc.). For example, each sub-system can experience deterioration and deviate from optimal performance conditions, such as the pressure sub-system can generate reduced pressure due to one or more of pump issues, control valve issues, etc. Failure to catch and repair these deteriorating conditions can cause defects in the substrates, leading to inferior products, reduced manufacturing yield, and significant downtime and repair time.

In some systems, recipes relating to substrate manufacturing processes, sensor data and metrology data obtained from manufacturing a substrate, and the evaluation systems used to analyze the obtained data are each propriety and owned by different entities (e.g., recipes and sensor data are customer owned while evaluations systems are service provider owned). Growing concerns about data privacy have caused entities to increase security measures related to their data. However, evaluation systems need to receive and analyze sensor and metrology data to improve the manufacturing process, which can result in unintentional loss of proprietary data.

Aspects and implementations of the present disclosure address these and other shortcomings of the existing technology by providing a system capable of performing secure data sharing. In particular, the present system can include a field service server (FSS) and an anonymizer server (hereafter anonymizer). Data generated by manufacturing equipment (e.g., sensor data) during a substrate manufacturing process can be encrypted and stored on a data store managed by the FSS. The FSS can be structured to allow for joint administration and management by two entities, such as a customer and a service provider. Each entity can hold cryptographic keys to certain components of the server.

In an illustrative example, the manufacturing process data can be encrypted by the service provider using, for example, a public key of a public-private key pair. The private key, which can be used to decrypt the manufacturing process data, can be held by the anonymizer. The anonymizer can be operated by a third entity. To access the encrypted manufacturing process data, permission may be required from both the service provider and the customer. For example, a database management system configured to store, retrieve, and run queries on the data store can be encrypted by both the service provider and the customer. In particular, the database management system can be first encrypted by a public key held by the customer, and then encrypted again by a public key held by the service provider. Each of the service provider and the customer can grant permission to obtain the encrypted manufacturing process data (via the database management system) by decrypting the database management system using their respective private keys.

The service provider can manage an application used to provide data analytics, predictive operations, corrective operations, etc. In response to a request, by the application, for the manufacturing process data, both entities (e.g., the customer and the service provider) can allow access to the encrypted manufacturing process data by decrypting the database management system. The encrypted manufacturing process data can then be sent to the anonymizer to remove sensitive information (e.g., confidential data, proprietary data, etc.). In particular, the anonymizer can decrypt (e.g., via the private key) the encrypted manufacturing process data, and perform one or more of a heuristic-based method, a machine-learning based method, a k-source anonymity-based method, an algorithmic-based method, etc. to remove the sensitive data. The anonymizer can then normalize the data to transform the data into a normalized dataset such that the normalized dataset retains certain features from the original data without revealing actual output values. The normalized data can then be sent to the application, where the application can use the data to perform data analytics, predictive operations, and/or corrective operations.

Aspects of the present disclosure result in technological advantages of enabling secure data sharing between two entities associated with a manufacturing system. In one example, the aspects of the present disclosure can allow an application to provide diagnostic data using anonymized data. This can result in generating the diagnostic data without risk to compromise sensitive and proprietary customer data at a manufacturing system.

FIG. 1 depicts an illustrative computer system architecture 100, according to aspects of the present disclosure. In some implementations, computer system architecture 100 can be included as part of a manufacturing system for processing substrates. Computer system architecture 100 includes a client device 110, manufacturing equipment 124, predictive system 160 (e.g., to generate predictive data, to provide model adaptation and modification, to use a knowledge base, etc., which will be described in detail in FIG. 3), data store 140, and anonymizer 150. The manufacturing equipment 124 can include sensors 126 configured to capture data for a substrate being processed at the manufacturing system. In some implementations, the manufacturing equipment 124 and sensors 126 can be part of a sensor system that includes a sensor server (e.g., field service server (FSS) 145) and sensor identifier reader (e.g., front opening unified pod (FOUP) radio frequency identification (RFID) reader for sensor system). In some implementations, metrology equipment 128 can be part of computer system architecture 100 that includes a metrology server (e.g., a metrology database, metrology folders, etc.) and metrology identifier reader (e.g., FOUP RFID reader for metrology system).

Manufacturing equipment 124 can produce products, such as electronic devices, following a recipe or performing runs over a period of time. Manufacturing equipment 124 can include a process chamber. Manufacturing equipment 124 can perform a process for a substrate (e.g., a wafer, etc.) at the process chamber. Examples of substrate processes include a deposition process to deposit one or more layers of film on a surface of the substrate, an etch process to form a pattern on the surface of the substrate, etc. Manufacturing equipment 124 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc.

In some implementations, manufacturing equipment 124 includes sensors 126 that are configured to generate data associated with a substrate processed at manufacturing system 100. For example, a process chamber can include one or more sensors configured to generate spectral or non-spectral data associated with the substrate before, during, and/or after a process (e.g., a deposition process, an etch process, etc.) is performed for the substrate. In some implementations, spectral data generated by sensors 126 can indicate a concentration of one or more materials deposited on a surface of a substrate. Sensors 126 configured to generate spectral data associated with a substrate can include reflectometry sensors, ellipsometry sensors, thermal spectra sensors, capacitive sensors, and so forth. Sensors 126 configured to generate non-spectral data associated with a substrate can include temperature sensors, pressure sensors, flow rate sensors, voltage sensors, etc. For example, each sensor 126 can be a temperature sensor, a pressure sensor, a chemical detection sensor, a chemical composition sensor, a gas flow sensor, a motion sensor, a position sensor, an optical sensor, or any and other type of sensors. Some or all of the sensors 126 can include a light source to produce light (or any other electromagnetic radiation), direct it towards a target, such as a component of the machine 100 or a substrate, a film deposited on the substrate, etc., and detect light reflected from the target. The sensors 126 can be located anywhere inside the manufacturing equipment 124 (for example, within any of the chambers including the loading stations, on one or more robots, on a robot blade, between the chambers, and so one), or even outside the manufacturing equipment 124 (where the sensors can test ambient temperature, pressure, gas concentration, and so on). Further details regarding manufacturing equipment 124 are provided with respect to FIG. 2.

In some implementations, sensors 126 provide sensor data (e.g., sensor values, features, trace data) associated with manufacturing equipment 124 (e.g., associated with producing, by manufacturing equipment 124, corresponding products, such as substrates). The manufacturing equipment 124 can produce products following a recipe or by performing runs over a period of time. Sensor data received over a period of time (e.g., corresponding to at least part of a recipe or run) can be referred to as trace data (e.g., historical trace data, current trace data, etc.) received from different sensors 126 over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

In some implementations, manufacturing equipment 124 can include controls 125. Controls 125 can include one or more components or sub-systems configured to enable and/or control one or more processes of manufacturing equipment 124. For example, a sub-system can include a pressure sub-system, a flow sub-system, a temperature sub-system and so forth, each sub-system having one or more components. The component can include, for example, a pressure pump, a vacuum, a gas deliver line, a plasma etcher, actuators etc. In some implementations, controls 125 can be managed based on data from sensors 126, input from control device 120, etc.

Metrology equipment 128 can provide metrology data associated with substrates processed by manufacturing equipment 124. The metrology data can include a value of film property data (e.g., wafer spatial film properties), dimensions (e.g., thickness, height, etc.), dielectric constant, dopant concentration, density, defects, etc. In some implementations, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

In some implementations, metrology equipment 128 can be included as part of the manufacturing equipment 124. For example, metrology equipment 128 can be included inside of or coupled to a process chamber and configured to generate metrology data for a substrate before, during, and/or after a process (e.g., a deposition process, an etch process, etc.) while the substrate remains in the process chamber. In some instances, metrology equipment 128 can be referred to as in-situ metrology equipment. In another example, metrology equipment 128 can be coupled to another station of manufacturing equipment 124. For example, metrology equipment can be coupled to a transfer chamber, such as transfer chamber 210 of FIG. 2, a load lock, such as load lock 220, or a factory interface, such as factory interface 206.

The client device 110 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some implementations, the metrology data can be received from the client device 110. Client device 110 can display a graphical user interface (GUI), where the GUI enables the user to provide, as input, metrology measurement values for substrates processed at the manufacturing system. The client device 110 can include user interface (UI) 112, application 114, and corrective action component 116.

Application 114 can be a computer program configured to provide maintenance, services, analytics, and predictive technologies performed by one or more evaluation systems (e.g., machine-learning models, inference engines, heuristics models, algorithms, physics-based engine, etc.). One or more evaluation systems (e.g., a machine-learning model) can be generated by predictive system 160, which is discussed with regards to FIG. 3. UI 112 can receive user input (e.g., via a Graphical User Interface (GUI) displayed via client device 110) associated with application 114. In some implementations, user interface 112 can be presented via a web browser (not shown) and application 114 can be hosted on an application server (not shown). Alternatively, the client device 110 includes a local (mobile or desktop) application 114 that provides user interface 112. In some implementations, user interface 112 can communicate with the application 114 via network 130.

In some implementations, input data can be sent to or processed by application 114. Corrective action component 116 can be part of application 114 or a separate system (e.g., program, application, etc.). In some implementations, the corrective action component 116 receives input data from at least one of anonymizer 150, manufacturing equipment 124, UI 112, FFS 145, predictive system 160, etc., determines a corrective action based on the input data, and causes the corrective action to be implemented Corrective action component 116 can receive user input (e.g., via a Graphical User Interface (GUI) displayed via the client device 110) of an indication associated with manufacturing equipment 124. For example, responsive to receiving an indication that sensor data satisfied a threshold criterion (e.g., exceeded or fell below a fault detection limit), the correction action module 116 can perform one or more corrective action (e.g., increase power, decrease flowrate, etc.). The corrective actions can be stored in a fault pattern library on data store 140.

In some implementations, corrective action component 116 transmits the indication to the predictive system 160 (or any other service provided by application 114), receives output (e.g., predictive data) from the predictive system 160, determines a corrective action based on the output, and causes the corrective action to be implemented. In some implementations, corrective action component 116 receives an indication of a corrective action from predictive system 160 and causes the corrective action to be implemented. Each client device 110 can include an operating system that allows users to one or more of generate, view, or edit data (e.g., indication associated with manufacturing equipment 124, corrective actions associated with manufacturing equipment 124, etc.).

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing a substrate at manufacturing equipment 124. For example, data store 140 can store data collected by sensors 126 at manufacturing equipment 124 before, during, or after a substrate process (referred to as process data). Process data can refer to historical process data (e.g., process data generated for a prior substrate processed at the manufacturing system) and/or current process data (e.g., process data generated for a current substrate processed at the manufacturing system). Data store can also store spectral data or non-spectral data associated with a portion of a substrate processed at manufacturing equipment 124. Spectral data can include historical spectral data and/or current spectral data.

Data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further include identify sensors that are associated with a particular sub-system of a process chamber.

Data store 140 can also store task data. Task data can include one or more sets of operations to be performed for the substrate during a deposition process and can include one or more settings associated with each operation. For example, task data for a deposition process can include a temperature setting for a process chamber, a pressure setting for a process chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

In some implementations, data store 140 can store statistics data. Statistics data can include statistics representative of the raw data, e.g., mean data (average), range data, standard deviation data, maximum and minimum data, median data, mode data, etc. Mean data can include a measured averages of two or more values. For example, mean data can be used to determine the average heater temperature, the process chamber pressure, the average flowrate of a gas, etc., during a step(s), a specific time duration, an entire process recipe, etc. Range data can include the middle observation in a set of data (e.g., a median temperature during a step). Range data can include the difference between a maximum value and a minimum value of a set of values (e.g., the range of the heater pressure during a process recipe). The standard deviation is measure of the amount of variation or dispersion of a set of values.

In some implementations, data store 140 can be configured to store data that is not accessible to a user of the manufacturing system. For example, process data, spectral data, contextual data, etc. obtained for a substrate being processed at the manufacturing system is not accessible to a user (e.g., an operator) of the manufacturing system. In some implementations, all data stored at data store 140 can be inaccessible by the user of the manufacturing system. In other or similar implementations, a portion of data stored at data store 140 can be inaccessible by the user while another portion of data stored at data store 140 can be accessible by the user. In some implementations, one or more portions of data stored at data store 140 can be encrypted using an encryption mechanism that is unknown to the user (e.g., data is encrypted using a private encryption key). In other or similar implementations, data store 140 can include multiple data stores where data that is inaccessible to the user is stored in one or more first data stores and data that is accessible to the user is stored in one or more second data stores.

In some implementations, data store 140 can be configured to store data associated with known fault patterns. A fault pattern can be a one or more values (e.g., a vector, a scalar, etc.) associated with one or more issues or failures associated with a process chamber sub-system. In some implementations, a fault pattern can be associated with a corrective action. For example, a fault pattern can include parameter adjustment steps to correct the issue or failure indicated by the fault pattern. For example, the predictive system or the corrective action module can compare a determined fault pattern (determined from data obtained from of one or more sensors of a sensor cluster) to a library of known fault patterns to determine the type of failure experienced by a sub-system, the cause of the failure, the recommended corrective action to correct the fault, and so forth.

Data store 140 can be part of or operationally connected to FSS 145. FSS 145 can include one or more physical machines (e.g., server machines, desktop computers, etc.) that each include one or more processing devices communicatively coupled to memory devices and input/output (I/O) devices. The processing devices can include a computer, microprocessor, logic device or other device or processor that is configured with hardware, firmware, and software to carry out some of the implementations described herein. FSS 145 will be discussed with regards to FIG. 3.

Anonymizer 150 can include one or more computing devices (e.g., a server machine) configured to perform one or more data anonymization operations on a data set(s). Data anonymization is a type of data sanitization whose intent is privacy protection. It is the process of removing personally identifiable information from data sets, so that certain date elements are not revealed. Anonymizer 150 can include decrypter 152, sanitizer 154, and normalizer 156.

Decrypter 152 can decrypt a dataset received from, for example FSS 145 (and/or data store 140). In particular, decrypter 152 can received an encrypted dataset from FSS 145. The dataset can be encrypted using, for example, one or more cryptographic keys (e.g., a public key, a private key, a symmetric key, an asymmetric key, a pre-shared key (PSK), etc.), a token, a digital certificate, etc. For example, FSS 145 (or any other component of manufacturing system 100 or an external component (not shown)) can encrypt plaintext data (e.g., sensor data, metrology data, recipe data, etc.) into ciphertext data using one or more cryptographic keys. The one or more cryptographic keys can be previously shared with anonymizer 150. Decrypter 152 can decrypt, into plaintext data, the received ciphertext data using the one or more previously shared cryptographic keys.

Sanitizer 154 can sanitize the decrypted dataset (e.g., the plaintext data). Sanitizer 154 can remove sensitive data (e.g., confidential data, proprietary data, etc.) from the dataset. Such data can include recipe data, setpoint data, identification data, yield data, certain metrology data, security data, etc. In some implementations, sanitizer 154 can remove certain metadata from the dataset. For example, the metadata can identify a recipe name, recipe input values, customer identification data, etc. In some implementations, sanitizer 154 can perform one or more of a heuristic-based method, a machine-learning based method, a k-source anonymity-based method, an algorithmic-based method or any other method configured to remove the sensitive data.

Normalizer 156 can transform the output values (e.g., trace data) of a dataset into a normalized dataset such that the normalized dataset retains certain features from the original dataset without revealing actual output values. Thus, the original output value can be kept confidential. In some implementations, normalizer 156 can generate, from the dataset, one or more of normalized summary statistics, synthetic data, scaled time series data, symbolic data (e.g., convert the data to arbitrary symbols), etc.

To generate normalized summary statistics, normalizer 156 can adjust dataset values measured on different scales to a notionally common scale. In some implementations, the normalized summary statistics can include dataset adjustments that bring the probability distributions of the adjusted values into an alignment. In some implementations, the normalized summary statistics can shift data values, scale data values, or perform other operations to mask the original output values.

Synthetic data can include data that is artificially generated from a dataset. In some implementations, normalizer 156 can generate synthetic data by applying, to the trace data, one or more of a filter, an algorithm, a machine learning model, a feature extraction and normalization algorithm, etc.

Figure 6A:
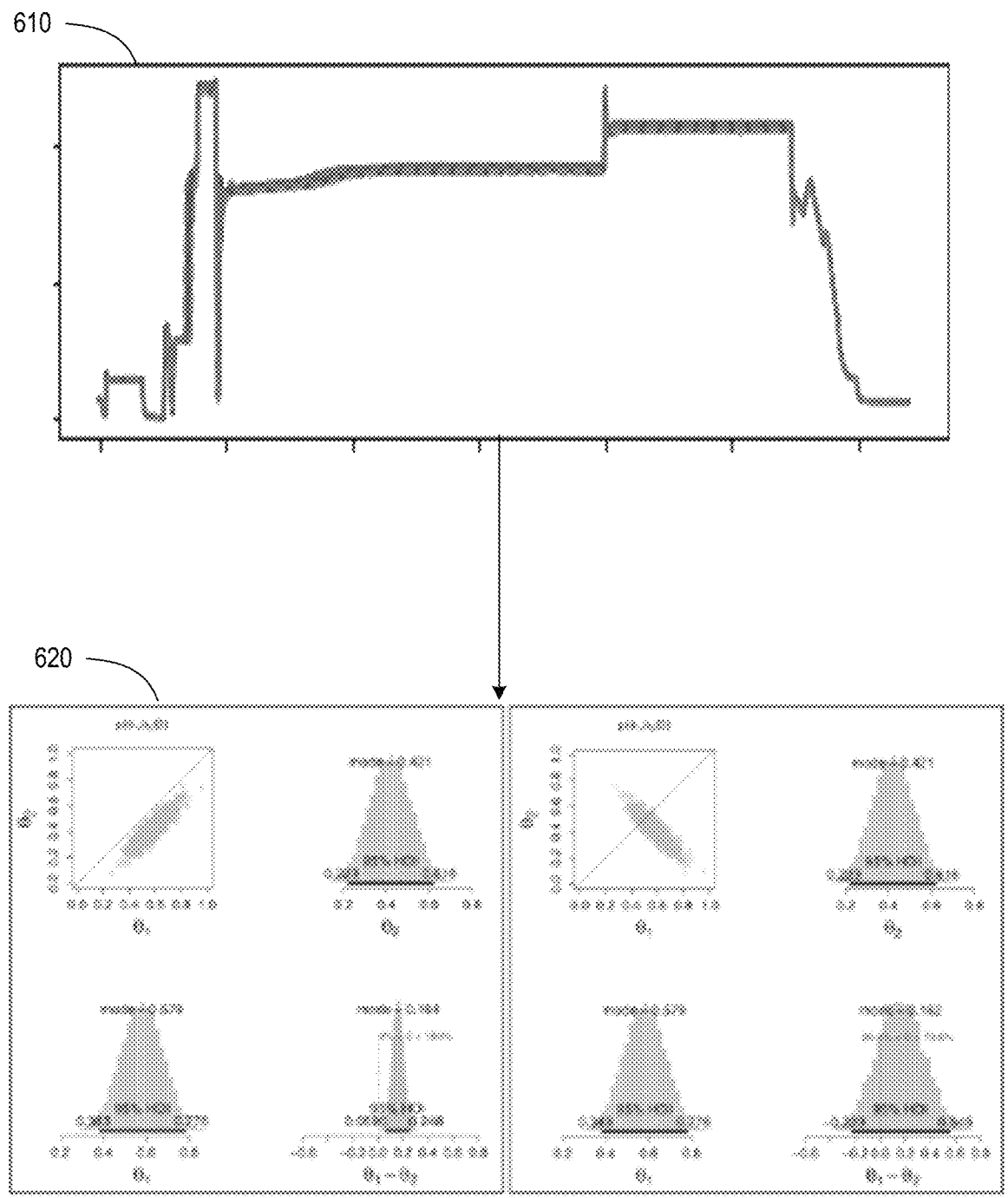
FIG. 6A is an illustration showing normalizer generating synthetic data, in accordance with some implementations of the present disclosure.

FIG. 6A is an illustration showing normalizer 156 generating synthetic data, in accordance with some implementations of the present disclosure. In particular, graph 610 illustrates example sensor data (e.g., trace data). The trace data can include particular output values (e.g., power values, pressure values, flow values, etc.) along the y-axis and time along the x-axis. Graph set 620 is a set of graphs illustrating normalizer 156 performing feature extraction on the output values and normalized statistics. Feature extraction can include identifying certain data points where the data values are informative (e.g., include relatively large increases or decreases).

Figure 6B:
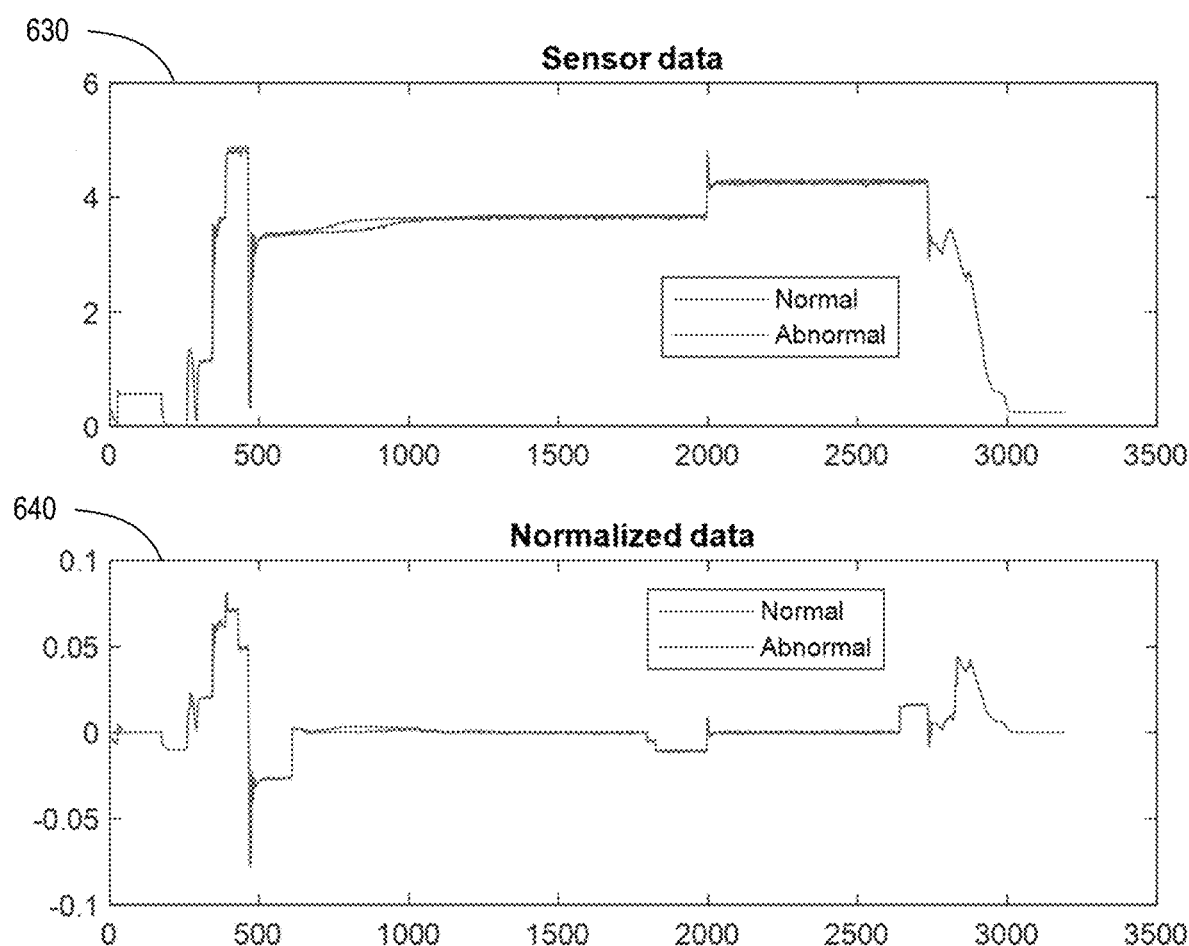
FIG. 6B is another illustration showing normalizer generating synthetic data, in accordance with some implementations of the present disclosure.
Figure 6C:
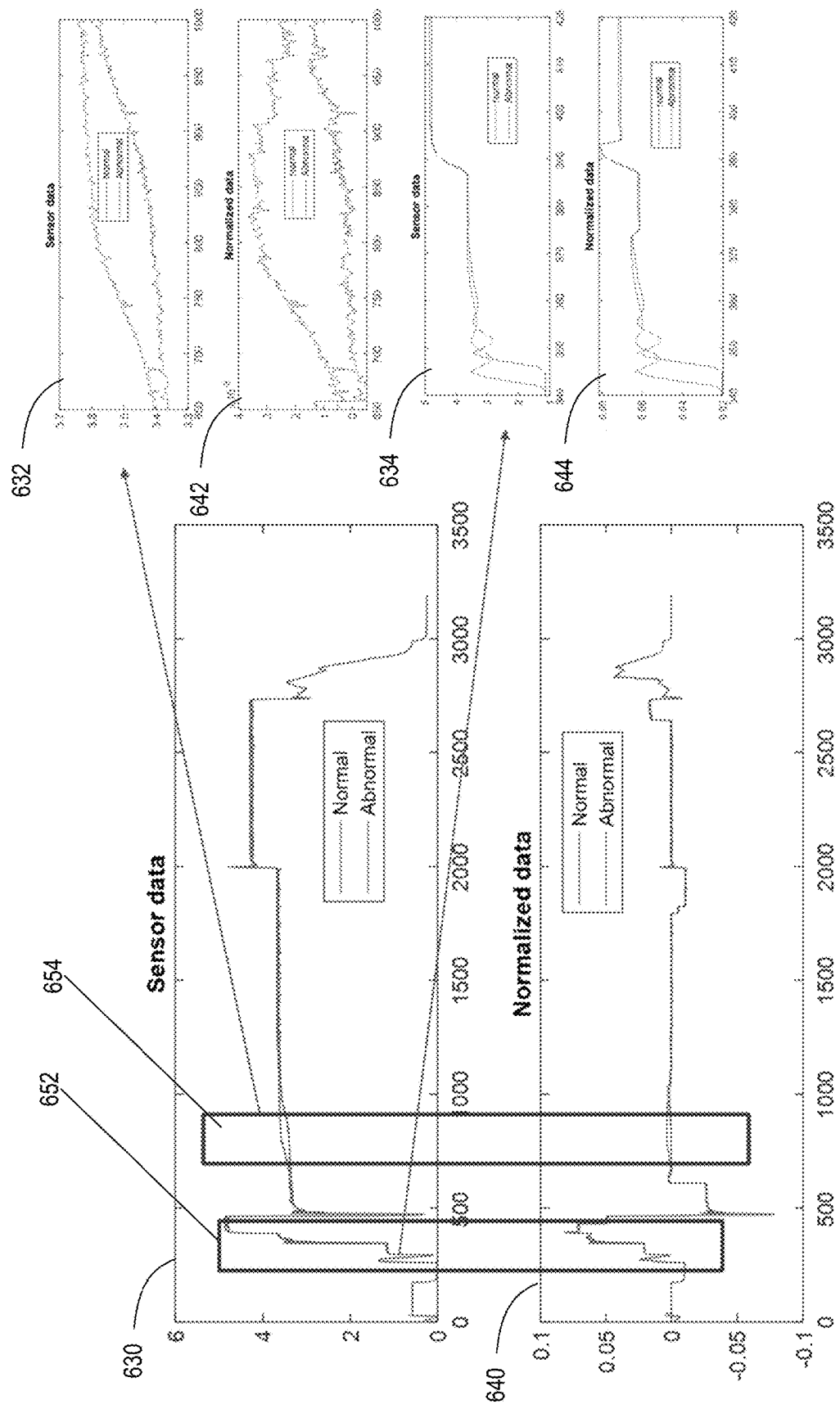
FIG. 6C illustrates graph sections of FIGS. 6A and 6B in greater detail, in accordance with some implementations of the present disclosure.

FIG. 6B is another illustration showing normalizer 156 generating synthetic data, in accordance with some implementations of the present disclosure. In particular, graph 630 illustrates example sensor data. Graph 640 illustrates example normalized data. As shown, the normalized data in graph 640 is transformed such as that the output values along the y-axis are altered while identifying informative data along the x-axis. FIG. 6C illustrates sections 652 and 654 of graphs 630 and 640 in greater detail. In particular, graph 632 illustrates section 654 of graph 630 in greater detail. Graph 642 illustrates section 654 of graph 640 in greater detail. Graph 634 illustrates section 652 of graph 630 in greater detail. Graph 644 illustrates section 652 of graph 640 in greater detail.

Returning to FIG. 1, in some implementations, operations performed by anonymizer 150 (e.g., operations performed by decrypter 152, sanitizer 154, and/or normalizer 156) can be performed in a privacy enhanced environment, such as, for example, a Trusted Execution Environment (TEE), a Multi-Party Compute (MPC) environment, a Federated Learning (FL) environment, a Fully Homomorphic Encryption (FHE) environment, etc. Performing the operations in a privacy enhanced environment can prevent an outside user from obtaining the sensitive and/or raw data prior to the dataset being sanitized and/or normalized.

TEE can use hardware-based encryption to encrypt data of a lower privileged process so that higher privileged computing processes would not have access to the data in an unencrypted form. This enables a lower privileged process to isolate its data from the higher privileged processes even though the higher privileged processes may be responsible for managing the data. In an example, the encryption can occur at a firmware level and can be set up so that the cryptographic keys are inaccessible to any and all operating system processes executing on the computer.

MPC can include a multi-party joint computation over shuffled data and computation nodes. In particular, MPC is a subfield of cryptography with the goal of creating methods for parties to jointly compute a function over their inputs while keeping those inputs private. The cryptography in MPC protects participants' privacy from each other.

FL (also known as collaborative learning) is a machine learning technique that trains an algorithm across multiple decentralized edge devices or servers holding local data samples, without exchanging them. This approach stands in contrast to traditional centralized machine learning techniques where all the local datasets are uploaded to one server, as well as to more classical decentralized approaches which often assume that local data samples are identically distributed.

FHE is a form of encryption that allows computations to be performed on encrypted data without decrypting the data. The resulting computations are left in an encrypted form which, when decrypted, results in an output that is identical to that produced had the operations been performed on the unencrypted data. Homomorphic encryption can be used for privacy-preserving outsourced storage and computation.

In some implementations, operations performed by application 114 can be performed in a privacy enhanced environment, such as, for example, a TEE, a MPC environment, a FL environment, a FHE environment, etc.

In some implementations, one or more algorithms or applications configured to perform the one or more data anonymization operations can be generated, encrypted, and/or sent to anonymizer 150 by FSS 145, client device 110, or an external entity. For example, FSS 145 can send to anonymizer 150 encrypted data on which to perform one or more anonymization operations, along with the algorithms to perform said one or more anonymization operations. Anonymizer 150 can receive the encrypted data and encrypted algorithms, and perform execute the algorithms on the encrypted data in a privacy enhanced environment. In some implementations, anonymizer 150 can encrypt the output data obtained from the anonymization operations (e.g., the normalized summary statistics, the synthetic data, the scaled time series data, the symbolic data, etc.). The output data can be decrypted by the requesting application (e.g., application 114) using, for example, a cryptographic key.

Although shown as components of anonymizer 150, each of decrypter 152, sanitizer 154, and normalizer 156 can be included in one or more other computing devices, such as a rackmount server, a router computer, a server computer, a personal computer, a mainframe computer, a laptop computer, a tablet computer, a desktop computer, a GPU, an ASIC, etc. Each component can execute instructions to perform any one or more of the methodologies and/or implementations described herein. The instructions can be stored on a computer readable storage medium, which can include the main memory, static memory, secondary storage and/or processing device (during execution of the instructions.

The client device 110, manufacturing equipment 124, sensors 126, predictive system 160, anonymizer 150, FSS 145, and data store 140 can be coupled to each other via a network 130. In some implementations, network 130 is a public network that provides client device 110 with access to anonymizer 150, predictive system 160, data store 140, FSS 145, manufacturing equipment 124 and other publicly available computing devices. In some implementations, network 130 is a private network that provides client device 110 access to manufacturing equipment 124, data store 140, FSS 145, anonymizer 150, predictive system 160, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long-Term Evolution (LTE) network), routers, hubs, switches, server computers, cloud computing networks, and/or a combination thereof.

In implementations, a "user" can be represented as a single individual. However, other implementations of the disclosure encompass a "user" being an entity controlled by a plurality of users and/or an automated source. For example, a set of individual users federated as a group of administrators can be considered a "user."

Figure 2:
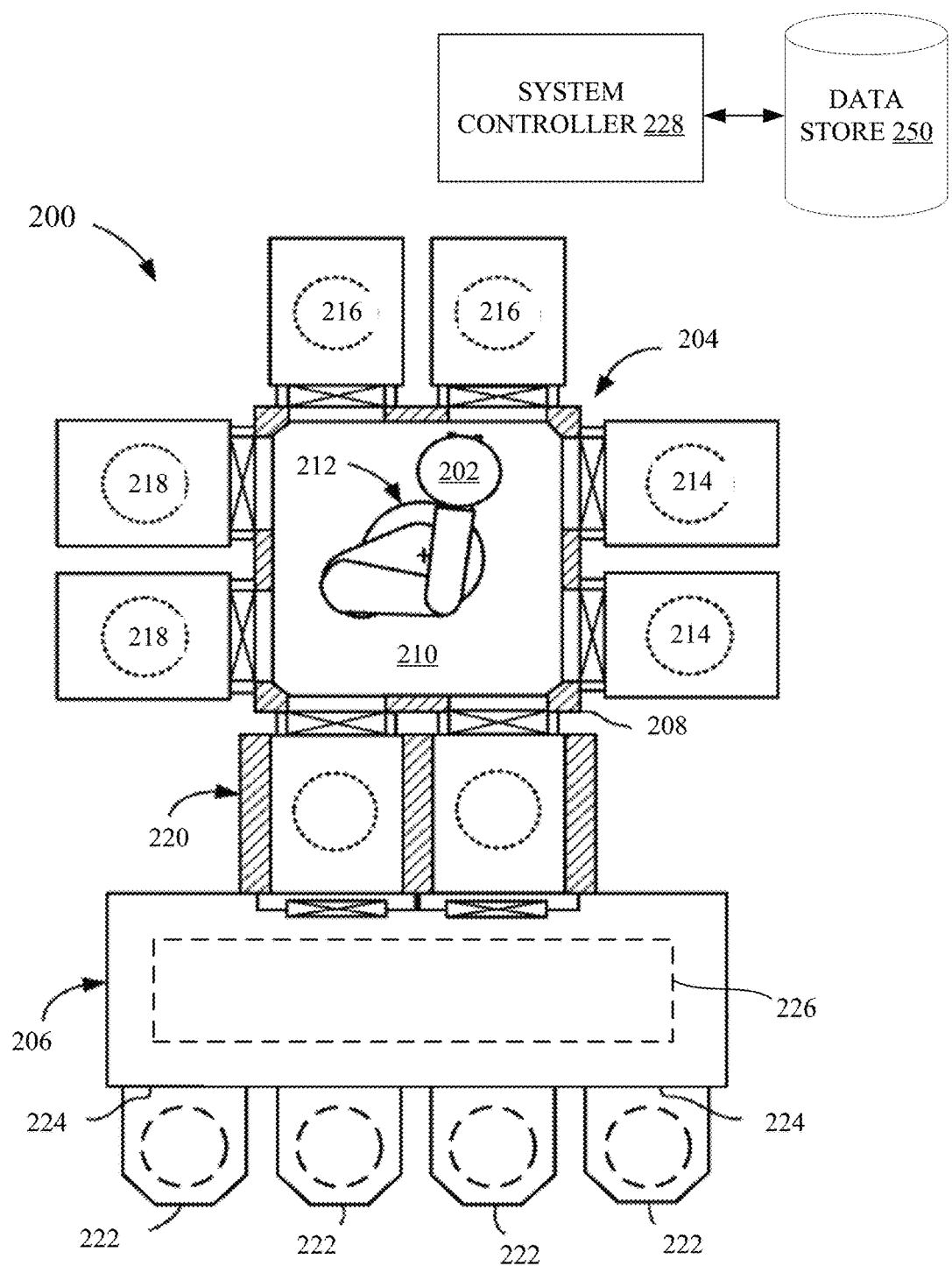
FIG. 2 is a top schematic view of an example manufacturing system, in accordance with some implementations of the present disclosure.

FIG. 2 is a top schematic view of an example manufacturing system 200, according to aspects of the present disclosure. Manufacturing system 200 can perform one or more processes on a substrate 202. Substrate 202 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 200 can include a process tool 204 and a factory interface 206 coupled to process tool 204. Process tool 204 can include a housing 208 having a transfer chamber 210 therein. Transfer chamber 210 can include one or more process chambers (also referred to as processing chambers) 214, 216, 218 disposed therearound and coupled thereto. Process chambers 214, 216, 218 can be coupled to transfer chamber 210 through respective ports, such as slit valves or the like. Transfer chamber 210 can also include a transfer chamber robot 212 configured to transfer substrate 202 between process chambers 214, 216, 218, load lock 220, etc. Transfer chamber robot 212 can include one or multiple arms where each arm includes one or more end effectors at the end of each arm. The end effector can be configured to handle particular objects, such as wafers, sensor discs, sensor tools, etc.

Process chambers 214, 216, 218 can be adapted to carry out any number of processes on substrates 202. A same or different substrate process can take place in each processing chamber 214, 216, 218. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 214, 216, 218 can each include one or more sensors configured to capture data for substrate 202 before, after, or during a substrate process. For example, the one or more sensors can be configured to capture spectral data and/or non-spectral data for a portion of substrate 202 during a substrate process. In other or similar implementations, the one or more sensors can be configured to capture data associated with the environment within process chamber 214, 216, 218 before, after, or during the substrate process. For example, the one or more sensors can be configured to capture data associated with a temperature, a pressure, a gas concentration, etc. of the environment within process chamber 214, 216, 218 during the substrate process.

In some implementations, metrology equipment (not shown) can be located within the process tool. In other implementations, metrology equipment (not shown) can be located within one or more process chambers 214, 216, 218. In some implementations, the substrate can be placed onto metrology equipment using transfer chamber robot 212. In other implementations, the metrology equipment can be part of the substrate support assembly (not shown). Metrology equipment can provide metrology data associated with substrates processed by manufacturing equipment 124. The metrology data can include a value of film property data (e.g., wafer spatial film properties), dimensions (e.g., thickness, height, etc.), dielectric constant, dopant concentration, density, defects, etc. In some implementations, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

A load lock 220 can also be coupled to housing 208 and transfer chamber 210. Load lock 220 can be configured to interface with, and be coupled to, transfer chamber 210 on one side and factory interface 206. Load lock 220 can have an environmentally controlled atmosphere that can be changed from a vacuum environment (wherein substrates can be transferred to and from transfer chamber 210) to an at or near atmospheric-pressure inert-gas environment (wherein substrates can be transferred to and from factory interface 206) in some implementations. Factory interface 206 can be any suitable enclosure, such as, e.g., an Equipment Front End Module (EFEM). Factory interface 206 can be configured to receive substrates 202 from substrate carriers 222 (e.g., Front Opening Unified Pods (FOUPs)) docked at various load ports 224 of factory interface 206. A factory interface robot 226 (shown dotted) can be configured to transfer substrates 202 between carriers (also referred to as containers) 222 and load lock 220. Carriers 222 can be a substrate storage carrier or a replacement part storage carrier.

Manufacturing system 200 can also be connected to a client device (e.g., client device 110, not shown) that is configured to provide information regarding manufacturing system 200 to a user (e.g., an operator). In some implementations, the client device can provide information to a user of manufacturing system 200 via one or more graphical user interfaces (GUIs). For example, the client device can provide information regarding a target thickness profile for a film to be deposited on a surface of a substrate 202 during a deposition process performed at a process chamber 214, 216, 218 via a GUI. The client device can also provide information regarding anomaly detection and fault classification, in accordance with implementations described herein.

Manufacturing system 200 can also include a system controller 228. System controller 228 can be and/or include a computing device such as a personal computer, a server computer, a programmable logic controller (PLC), a microcontroller, and so on. System controller 228 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 228 can include a data storage device (e.g., one or more disk drives and/or solid-state drives), a main memory, a static memory, a network interface, and/or other components. System controller 228 can execute instructions to perform any one or more of the methodologies and/or implementations described herein. In some implementations, system controller 228 can execute instructions to perform one or more operations at manufacturing system 200 in accordance with a process recipe. The instructions can be stored on a computer readable storage medium, which can include the main memory, static memory, secondary storage and/or processing device (during execution of the instructions).

System controller 228 can receive data from sensors (e.g., sensors 126, now shown) included on or within various portions of manufacturing system 200 (e.g., processing chambers 214, 216, 218, transfer chamber 210, load lock 220, etc.). In some implementations, data received by the system controller 228 can include spectral data and/or non-spectral data for a portion of substrate 202. In other or similar implementations, data received by the system controller 228 can include data associated with processing substrate 202 at processing chamber 214, 216, 218, as described previously. For purposes of the present description, system controller 228 is described as receiving data from sensors included within process chambers 214, 216, 218. However, system controller 228 can receive data from any portion of manufacturing system 200 and can use data received from the portion in accordance with implementations described herein. In an illustrative example, system controller 228 can receive data from one or more sensors for process chamber 214, 216, 218 before, after, or during a substrate process at the process chamber 214, 216, 218. Data received from sensors of the various portions of manufacturing system 200 can be stored in a data store 250. Data store 250 can be included as a component within system controller 228 or can be a separate component from system controller 228. In some implementations, data store 250 can be data store 140 described with respect to FIG. 1. Data store 250 can be coupled to FSS 145.

Figure 3:
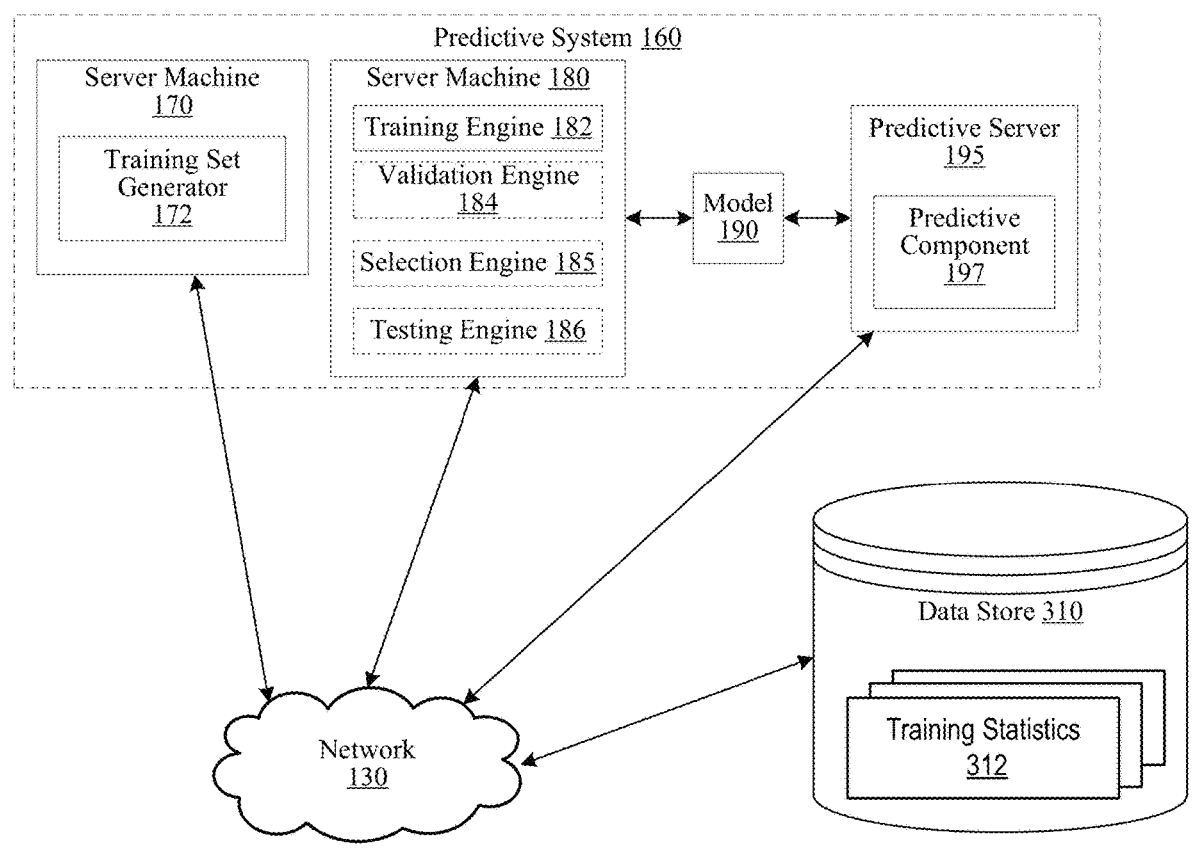
FIG. 3 is a block diagram illustrating an example predictive architecture, in accordance with some implementations of the present disclosure.

FIG. 3 depicts an illustrative predictive architecture 300, according to aspects of the present disclosure. In some implementations, predictive architecture 300 include predictive system 160, network 130, and data store 310 (which can be similar to the same as data store 140). In some implementations, predictive system 160 can use a model (e.g., model 190) to group two or more sensor based on, for example, sensor statistics data. For example, model 190 can received sensor statistics data as input, and generate, as output, sensor cluster data. In some implementations, predictive system 160 can include predictive server 112, server machines 170 and 180, and predictive server 195. The predictive server 160, server machine 170, server machine 180, and predictive server 195 can each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Server machine 170 includes a training set generator 172 that is capable of generating training data sets (e.g., a set of data inputs and a set of target outputs) to train, validate, and/or test a machine-learning model 190. Machine-learning model 190 can be any algorithmic model capable of learning from data. In some implementations, machine-learning model 190 can be a predictive model. In some implementations, the data set generator 172 can partition the training data into a training set, a validating set, and a testing set, which can be stored, as part of the training statistics 312, in the training data store 310. Training statistics 312 which can be accessible to the computing device predictive system 160 directly or via network 130. In some implementations, the predictive system 160 generates multiple sets of training data.

Server machine 180 can include a training engine 182, a validation engine 184, a selection engine 185, and/or a testing engine 186. An engine can refer to hardware (e.g., circuitry, dedicated logic, programmable logic, microcode, processing device, etc.), software (such as instructions run on a processing device, a general-purpose computer system, or a dedicated machine), firmware, microcode, or a combination thereof. Training engine 182 can be capable of training one or more machine-learning model 190. Machine-learning model 190 can refer to the model artifact that is created by the training engine 182 using the training data (also referred to herein as a training set) that includes training inputs and corresponding target outputs (correct answers for respective training inputs). The training engine 182 can find patterns in the training data that map the training input to the target output (the answer to be predicted), and provide the machine-learning model 190 that captures these patterns. The machine-learning model 190 can use one or more of a statistical modelling, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

One type of machine learning model that can be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities can be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks can learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a plasma process tuning, for example, the raw input can be process result profiles (e.g., thickness profiles indicative of one or more thickness values across a surface of a substrate); the second layer can compose feature data associated with a status of one or more zones of controlled elements of a plasma process system (e.g., orientation of zones, plasma exposure duration, etc.); the third layer can include a starting recipe (e.g., a recipe used as a starting point for determining an updated process recipe the process a substrate to generate a process result the meets threshold criteria). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs can be that of the network and can be the number of hidden layers plus one. For recurrent neural networks, in which a signal can propagate through a layer more than once, the CAP depth is potentially unlimited.

In one implementation, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future flow rate measurements and make predictions based on this continuous metrology information. RNNs can be trained using a training dataset to generate a fixed number of outputs (e.g., to determine a set of substrate processing rates, determine modification to a substrate process recipe). One type of RNN that can be used is a long short term memory (LSTM) neural network.

Training of a neural network can be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset.

A training dataset containing hundreds, thousands, tens of thousands, hundreds of thousands or more sensor data and/or process result data (e.g., metrology data such as one or more thickness profiles associated with the sensor data) can be used to form a training dataset.

To effectuate training, processing logic can input the training dataset(s) into one or more untrained machine learning models. Prior to inputting a first input into a machine learning model, the machine learning model can be initialized. Processing logic trains the untrained machine learning model(s) based on the training dataset(s) to generate one or more trained machine learning models that perform various operations as set forth above. Training can be performed by inputting one or more of the sensor data into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer can be another hidden layer or an output layer. In either case, the nodes at the next layer receive the output values from the nodes at the previous layer, and each node applies weights to those values and then generates its own output value. This can be performed at each layer. A final layer is the output layer, where there is one node for each class, prediction and/or output that the machine learning model can produce.

Accordingly, the output can include one or more predictions or inferences. In some implementations, an output prediction or inference can include one or more predictions of sensor group classifications, sensor rankings, etc. In some implementations, an output prediction or inference can include one or more predictions of anomaly data, fault data, fault detection limits, etc. Processing logic determines an error (i.e., a classification error) based on the differences between the output (e.g., predictions or inferences) of the machine learning model and target labels associated with the input training data. Processing logic adjusts weights of one or more nodes in the machine learning model based on the error. An error term or delta can be determined for each node in the artificial neural network. Based on this error, the artificial neural network adjusts one or more of its parameters for one or more of its nodes (the weights for one or more inputs of a node). Parameters can be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters can include adjusting the weights assigned to each of the inputs for one or more neurons at one or more layers in the artificial neural network.

After one or more rounds of training, processing logic can determine whether a stopping criterion has been met. A stopping criterion can be a target level of accuracy, a target number of processed images from the training dataset, a target amount of change to parameters over one or more previous data points, a combination thereof and/or other criteria. In one implementation, the stopping criteria is met when at least a minimum number of data points have been processed and at least a threshold accuracy is achieved. The threshold accuracy can be, for example, 70%, 80% or 90% accuracy. In one implementation, the stopping criterion is met if accuracy of the machine learning model has stopped improving. If the stopping criterion has not been met, further training is performed. If the stopping criterion has been met, training can be complete. Once the machine learning model is trained, a reserved portion of the training dataset can be used to test the model.

Once one or more trained machine learning models 190 are generated, they can be stored in predictive server 195 as predictive component 197 or as a component of predictive component 197.

The validation engine 184 can be capable of validating machine-learning model 190 using a corresponding set of features of a validation set from training set generator 172. Once the model parameters have been optimized, model validation can be performed to determine whether the model has improved and to determine a current accuracy of the deep learning model. The validation engine 184 can determine an accuracy of machine-learning model 190 based on the corresponding sets of features of the validation set. The validation engine 184 can discard a trained machine-learning model 190 that has an accuracy that does not meet a threshold accuracy. In some implementations, the selection engine 185 can be capable of selecting a trained machine-learning model 190 that has an accuracy that meets a threshold accuracy. In some implementations, the selection engine 185 can be capable of selecting the trained machine-learning model 190 that has the highest accuracy of the trained machine-learning models 190.

The testing engine 186 can be capable of testing a trained machine-learning model 190 using a corresponding set of features of a testing set from data set generator 172. For example, a first trained machine-learning model 190 that was trained using a first set of features of the training set can be tested using the first set of features of the testing set. The testing engine 186 can determine a trained machine-learning model 190 that has the highest accuracy of all of the trained machine-learning models based on the testing sets.

Predictive server 195 includes a predictive component 197 that is capable of providing data fault detection data and/or anomaly detection data. This will be explained in further detail below. In some implementations, predictive server 195 can receive input data from, for example, client device 110. As will be explained in greater detail below, one or more anonymization operations can be performed via anonymizer 150, on the input data to, for example, sanitize and/or normalize the data.

It should be noted that in some other implementations, the functions of server machines 170 and 180, as well as predictive server 195, can be provided by a fewer number of machines. For example, in some implementations, server machines 170 and 180 can be integrated into a single machine, while in some other or similar implementations, server machines 170 and 180, as well as predictive server 195, can be integrated into a single machine.

In general, functions described in one implementation as being performed by server machine 170, server machine 180, and/or predictive server 195 can also be performed on client device 110. In addition, the functionality attributed to a particular component can be performed by different or multiple components operating together.

In some implementations, a manufacturing system can include more than one process chambers. For example, example manufacturing system 200 of FIG. 2 illustrates multiple process chambers 214, 216, 218. It should be noted that, in some implementations, data obtained to train the machine-learning model 190 and data collected to be provided as input to the machine-learning model can be associated with the same process chamber of the manufacturing system. In other or similar implementations, data obtained to train the machine-learning model and data collected to be provided as input to the machine-learning model can be associated with different process chambers of the manufacturing system. In other or similar implementations, data obtained to train the machine-learning model can be associated with a process chamber of a first manufacturing system and data collected to be provide as input to the machine-learning model can be associated with a process chamber of a second manufacturing system.

Figure 4B:
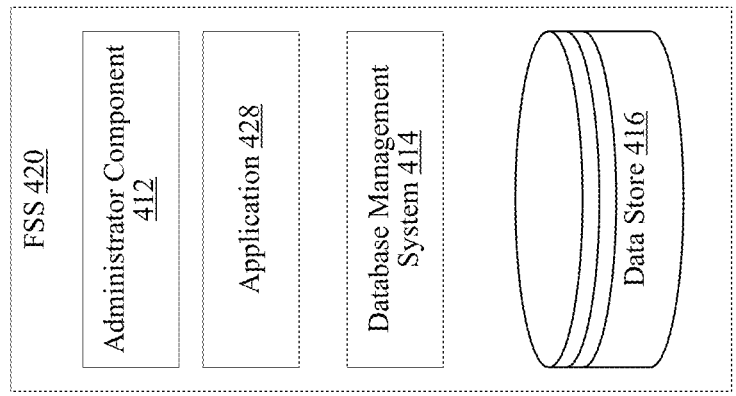
FIGS. 4A-4B depict example field service server architecture, in accordance with some implementations of the present disclosure.
Figure 4A:
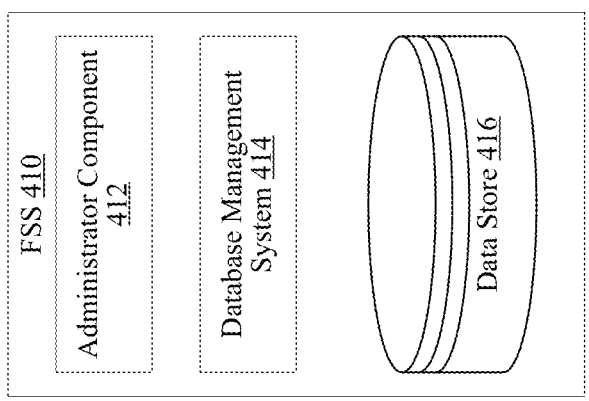

FIGS. 4A-4B depict example FSS architecture. In particular, FIG. 4A depicts FSS 410 and FIG. 4B depicts FSS 420. FSS 410 and FSS 420 can be similar to or the same as FSS 145 of FIG. 1. FSS 410 can include administrator component 412, database management system 414, and data store 416. FSS 420 can include administrator component 412, database management system 414, data store 416, and application 428.

Application 428 can be similar to or the same as application 114 of FIG. 1. In some implementations, application 428 (or application 114) can be encrypted to prevent unauthorized access. For example, 428 can be encrypted using a public-private key pair. As will be explained in greater detail below, application 428 can requires access to data stored on data store 416 to, for example, run data analytics, predictive operations, and/or corrective operations.

Data store 416 can store data obtained from one or more of manufacturing equipment 124, metrology equipment 128, predictive system 160, or any other component of system 100 of FIG. 1. In an example, data store 416 can store trace data, sensor data, statistics data, alarm data, fault data, etc. Data store 416 can be similar to or the same as data store 140 of FIG. 1. In some implementations, the data stored on data store 416 can be encrypted. In an example, the data stored in data store 416 can be encrypted using one or more cryptographic keys, one or more tokens, one or more certificates, etc. In some implementations, the data can be encrypted using a public key of a public/private key pair. For example, the data can be encrypted, via the public key, by FSS 410, 420, manufacturing equipment 124 and/or metrology equipment 128. The data can then be decrypted by a private key of the key pair. In some implementations, the private key pair can be held by anonymizer 150 or a different entity. As such, the data cannot be decrypted by FSS 410, 420.

Database management system 414 can be a system used to store, retrieve, and run queries on data. In particular, database management system 414 can be an interface between an entity (e.g., application 114, 428, manufacturing equipment 124, etc.), and a database (e.g., data store 416, 140), allowing the entity to create, read, update, and delete data in the database. In an example, database management system 414 can be used to obtain access to data stored on data store 416. Database management system 414 can be encrypted (e.g., via one or more cryptographic keys, one or more tokens, one or more certificates, etc.). In some implementations, accessing database management system 414 can require joint permission. Joint permission requires permission from two or more entities to access database management system 414. In an illustrative example, database management system 414 can first be encrypted (via a public key, for example) by a first entity and then by a second entity (via a public key, for example). Thus, to access database management system 414, the second entity can decrypt (via a private key, for example) database management system 414, and then the first entity can decrypt (via a private key, for example) database management system 414. In some implementations, the public key from the first entity and the public key from the second entity can be combined into a combined encryption key (via, for example, a XOR operation), and the combined encryption key can be used to encrypt the database management system 414. For decryption operations, the private key from the first entity and the private key from the second entity can be combined into a combined decryption key (via, for example, a XOR operation), and the combined decryption key can be used to decrypt the database management system 414.

Administrator component 412 can manage access, by application 114 (not shown) or application 428, to database management system 414, and/or data store 416. In some implementations, administer component 412 be configured to allow an application access to database management system 414 (and, thus, access data store 416). In particular, administrator component 412 can determine whether application 114, 428 has access to certain data, at what time application 114, 428 can access the data, which data can be accessed, etc. For example, FSS 410, 420 can receive a request, from application 114 or application 428, for access to sensor data associated with a particular process run at a particular process chamber. Administrator component 412 can determine whether the application 114, 428 can access the requested data, whether certain data from the request will be denied, at what time or time interval application 114, 428 can access the requested data, etc.

FIG. 5 is a table illustrating an illustrative example of cryptographic key relationships, in accordance with some implementations of the present disclosure. As shown, column 510 lists the key name where each key name reflects which component the respective key is associated with. For example, administrator key can be used to encrypt and/or decrypt administrator component 412, data management system key can be used to encrypt and/or decrypt data management system 414, data store key can be used to encrypt and/or decrypt data store 416 (or data store 140), and application key can be used to encrypt and/or decrypt application 114, 428. Column 520 lists the key type. For example, public key can be the public key of a public-private key pair, private key can be the private key of a public-private key pair, symmetric key can be an algorithm for cryptography that use the same cryptographic keys for both the encryption of plaintext and the decryption of ciphertext, or any combination thereof. Column 530 lists the owner of each key (e.g., a first entity, a second entity, a third entity, etc.). As shown, a first entity (e.g., a customer) has access to the administrator key and one of the decryption keys for the database management system 414. A second entity (e.g., a service provider) has access to the encryption key for encrypting data store 416, the encryption key for encrypting database management system 414, the other decryption key for the database management system 414, and the encryption and decryption key pair for application 428. A third entity (e.g., anonymizer provider) has access to the decryption key for data store 416.

Figure 7:
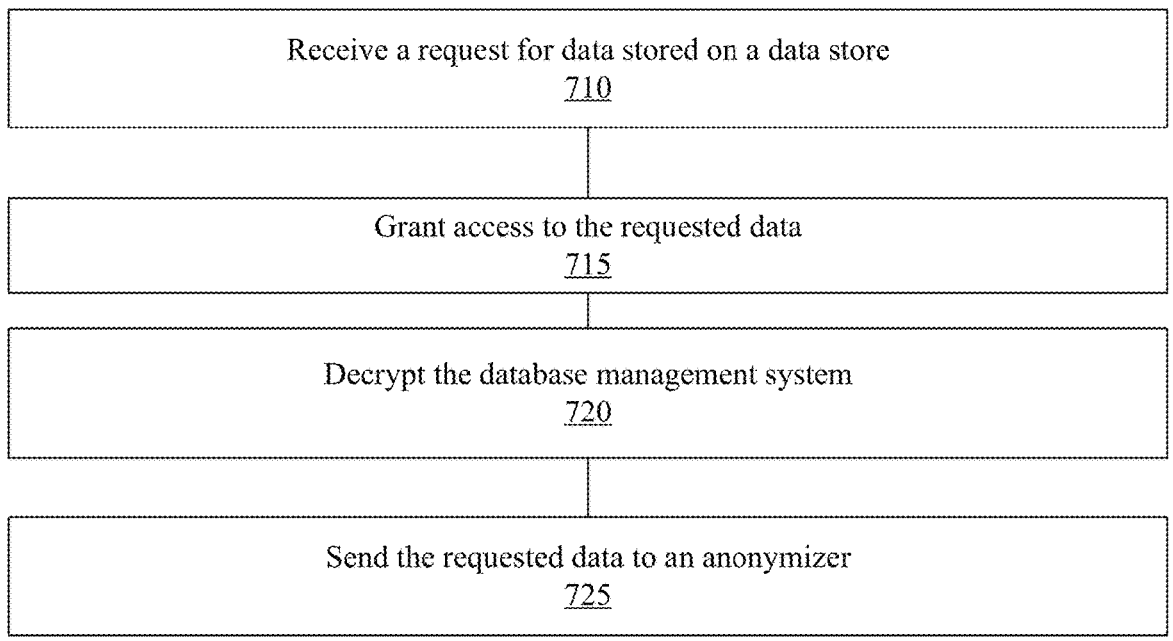
FIG. 7 is a flow chart of a method for obtaining data requested from a field service server, according to aspects of the present disclosure.

FIG. 7 is a flow chart of a method 700 for obtaining data requested from a FSS, in accordance with some implementations of the present disclosure. Method 700 is performed by processing logic that can include hardware (circuitry, dedicated logic, etc.), software (such as is run on a general-purpose computer system or a dedicated machine), firmware, or some combination thereof. In one implementation, method 700 can be performed by a computer system, such as computer system architecture 100 of FIG. 1. In other or similar implementations, one or more operations of method 700 can be performed by one or more other machines not depicted in the figures. In some aspects, one or more operations of method 700 can be performed by client device 110, FSS 145, anonymizer 150, and/or predictive system 160. In some implementations, method 700 is performed by FSS 145.

In some implementations, diagnostic data can refer to data analytics, predictive operations, corrective operations, etc. In some implementations, diagnostic data can be generated using, for example, predictive system 160.

At operation 710, processing logic receives a request for data stored on a data store. For example, the processing logic can receive a request, from application 114, for sensor data related to a particular process run performed by a particular process chamber of manufacturing equipment 124. In some implementations, the requested data can be encrypted. In some implementations, the application can be hosted by the FSS server. In other implementations, the application can be hosted by another server or computing device.

At operation 715, processing logic grants access to the requested data. In some implementations, the access can be granted via user input. For example, a user interface can display a prompt requesting access to the data. Responsive to receiving a user selection (e.g., selection of a button) to allow the access to the data, the processing logic can grant access to the requested data. In implementations where access is not granted, the processing logic can deny the request. In some implementations, the processing logic grant access based on a predetermined criterion. The predetermined criterion can include the identification of the requesting application, the type of data requested, the time when the data is requested, etc. For example, the processing logic can receive the request from a particular application, perform a lookup in a data table to determine whether the application has permission to access the requested data, and based on the lookup, grant access to the requested data.

At operation 720, processing logic decrypts the database management system (e.g., database management system 414). In some implementations, to decrypt the database management system, the processing logic can decrypt the database management system using a first private key and then a second private key. One of the private key can be controlled by a first entity (e.g., a customer) while the second private key can be controller by a second entity (e.g., a service provider). In some implementations, the request by the application can provide the processing logic with one of the private key, or be configured to grant access to the private key stone locally on the FSS. Receiving access to the requested data can provide the processing logic with access to the second private key.

At operation 725, processing logic sends the requested data to an anonymizer. For example, the processing logic can, using the database management system, obtain the requested data from the data store and send the obtained data to the anonymizer. In some implementations, the obtained data can be encrypted. In some implementations, the processing logic can send, to the anonymizer, one or more algorithms and/or applications configured to perform one or more anonymization operations on the requested data. In some implementations, the one or more algorithms and/or applications can be encrypted.

Figure 8:
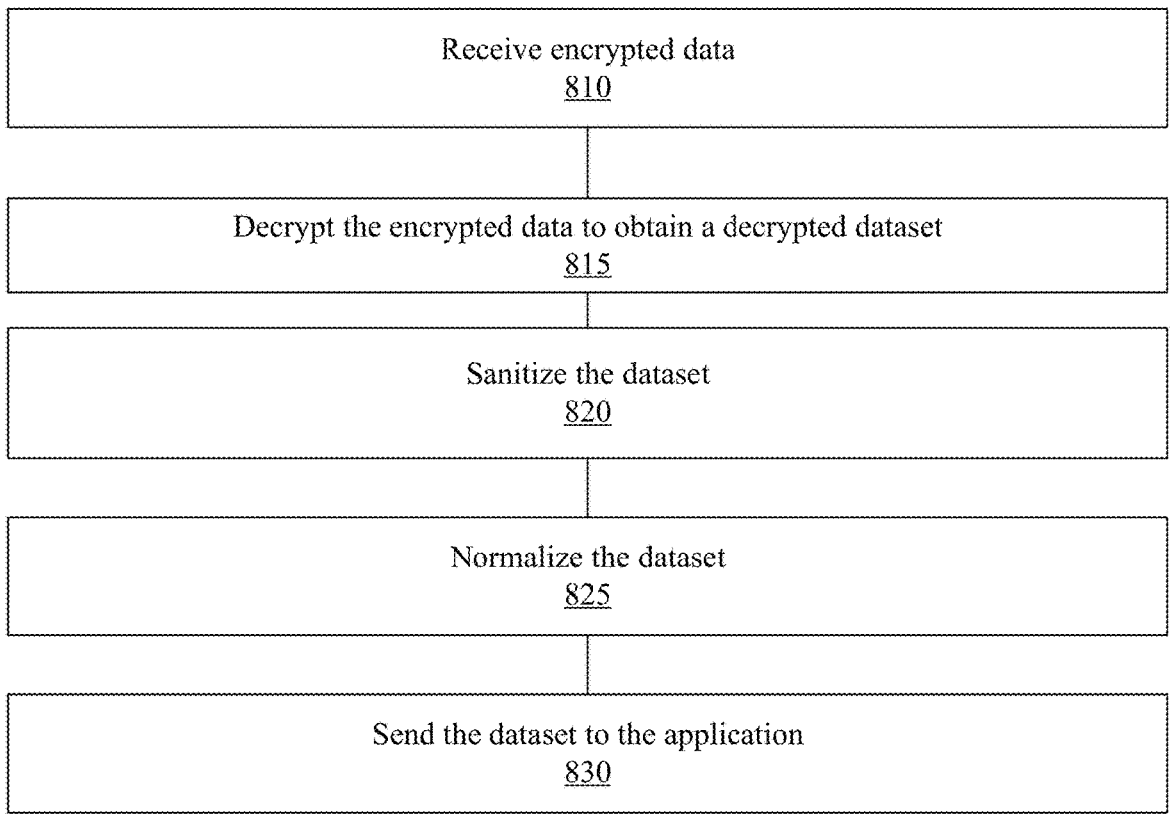
FIG. 8 is a flow chart of a method for anonymizing data obtained from a field service server, according to aspects of the present disclosure.

FIG. 8 is a flow chart of a method 800 for anonymizing data obtained from a FSS, in accordance with some implementations of the present disclosure. Method 800 is performed by processing logic that can include hardware (circuitry, dedicated logic, etc.), software (such as is run on a general-purpose computer system or a dedicated machine), firmware, or some combination thereof. In one implementation, method 800 can be performed by a computer system, such as computer system architecture 800 of FIG. 1. In other or similar implementations, one or more operations of method 800 can be performed by one or more other machines not depicted in the figures. In some aspects, one or more operations of method 800 can be performed by client device 110, FSS 145, anonymizer 150, and/or predictive system 160. In some implementations, method 800 is performed by anonymizer 150. In some implementations, the one or more operations of method 800 can be performed in a privacy enhanced environment (e.g., TEE, MPC, FL, FHE, etc.

At operation 810, processing logic receives encrypted data. For example, the processing logic can receive the encrypted data from the FSS via operation 725 of FIG. 7. In some implementations, the processing logic can also receive one or more algorithms and/or applications configured to perform one or more anonymization operations on the received data. In some implementations, the one or more algorithms and/or applications configured to perform the one or more anonymization operations can be already stored on the anonymizer (e.g., received from a previous instance).

At operation 815, processing logic decrypts the encrypted data to obtain a decrypted dataset. For example, the processing logic can use one or more cryptographic keys stored on the anonymizer to decrypt the data. In some implementations, the processing logic can also decrypt the one or more algorithms and/or applications configured to perform the one or more anonymization operations on the received data using, for example, one or more cryptographic keys stored on the anonymizer.

At operation 820, processing logic sanitizes the dataset. In some implementations, the processing logic can perform one or more anonymization operations related to the receive one or more algorithms and/or applications. For example, the processing logic can remove sensitive data (e.g., confidential data, proprietary data, etc.) from the dataset by performing one or more of a heuristic-based method, a machine-learning based method, a k-source anonymity-based method, an algorithmic-based method, etc.

At operation 825, processing logic normalizes the dataset. In some implementations, the processing logic can generate, from the dataset, one or more of normalized summary statistics, synthetic data, scaled time series data, symbolic data, etc.

At operation 830, processing logic sends the dataset to the requesting application. Once received, the application can perform one or more operations on the data set to obtain diagnostic data (e.g., data analytics, predictive operations, corrective operations). In some implementations, processing logic can encrypt the dataset prior to sending the dataset to the requesting application. In such implementations, the requesting application can unencrypt the encrypted dataset once received. For example, the application can use a cryptographic key to unencrypt the encrypted dataset.

Figure 9:
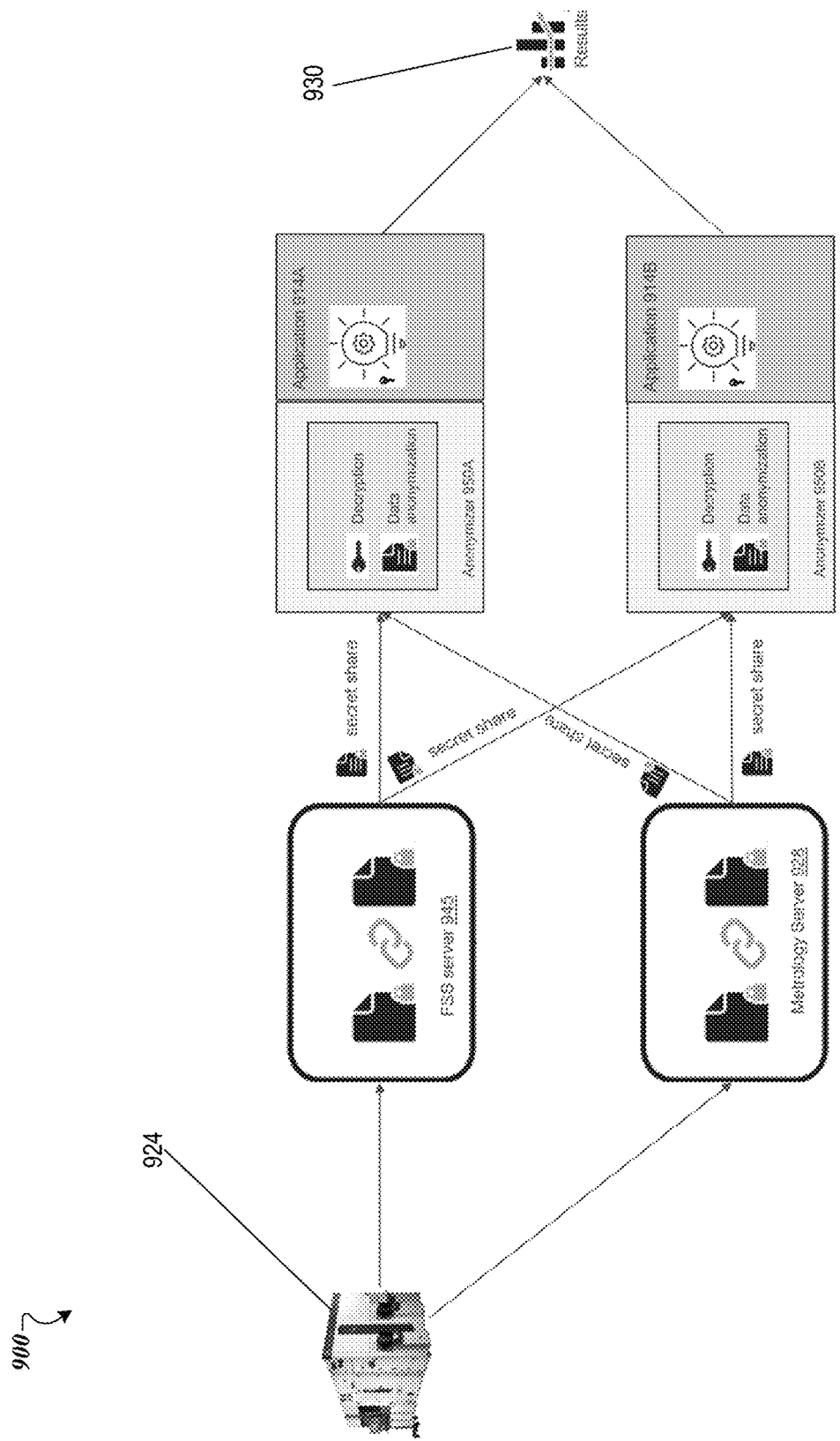
FIG. 9 is a block diagram illustrating an example architecture for multi-entity data sources, in accordance with some implementations of the present disclosure.

FIG. 9 is a block diagram illustrating an example computer system architecture 900 for multi-entity data sources, in accordance with some implementations of the present disclosure. In some implementations, computer system architecture 900 includes manufacturing equipment 924, FSS server 945, metrology server 928, anonymizer 950A-B, application 914A-B, and results 930. Manufacturing equipment 924 can produce products and be similar to or the same as manufacturing equipment 124. Manufacturing equipment 924 can generate manufacturing process data (e.g., sensor data, trace data, etc.) and send the to FSS server 945 for storage. The manufacturing process data can be encrypted by manufacturing equipment 924 and or by FSS server 945. Manufacturing equipment 924 can further send data to metrology server 928 and/or metrology server 928 can generate metrology data from the products produced by manufacturing equipment 924. Metrology server 928 can be similar or the same as metrology equipment 128. In some implementations, metrology server 928 can include an architecture similar to that of FSS 145. For example, metrology server 928 can include one or more of an administrator component, a database management system, and/or a data store.

Manufacturing equipment 924 can send encrypted data to anonymizer 950Aa and to anonymizer 950B. Metrology server 928 can send encrypted data to anonymizer 950Aa and to anonymizer 950B. Anonymizer 950A-B can decrypt, sanitize, and normalize the receive data and send said data to respective applications 914A-B. Application 914A-B can use the received data to generate diagnostic data 930.

Figure 10:
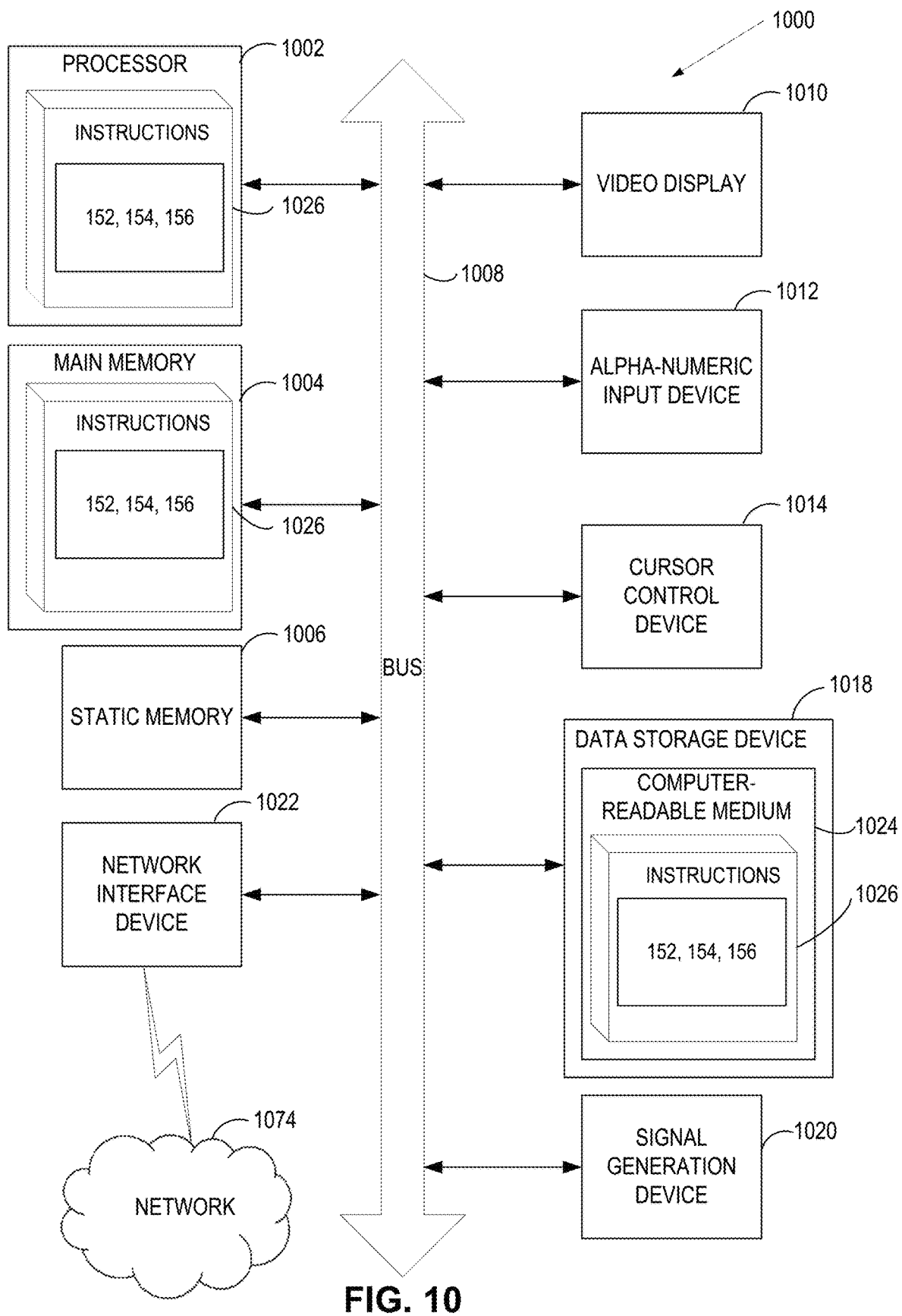
FIG. 10 is a block diagram illustrating a computer system, according to certain implementations.

FIG. 10 is a block diagram illustrating a computer system 1000, according to certain implementations. In some implementations, computer system 1000 can be connected (e.g., via a network, such as a Local Area Network (LAN), an intranet, an extranet, or the Internet) to other computer systems. Computer system 1000 can operate in the capacity of a server or a client computer in a client-server environment, or as a peer computer in a peer-to-peer or distributed network environment. Computer system 1000 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 can include a processing device 1002, a volatile memory 1004 (e.g., Random Access Memory (RAM)), a non-volatile memory 1006 (e.g., Read-Only Memory (ROM) or Electrically-Erasable Programmable ROM (EEPROM)), and a data storage device 1016, which can communicate with each other via a bus 1008.

Processing device 1002 can be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 1000 can further include a network interface device 1022 (e.g., coupled to network 1074). Computer system 1000 also can include a video display unit 1010 (e.g., an LCD), an alphanumeric input device 1012 (e.g., a keyboard), a cursor control device 1014 (e.g., a mouse), and a signal generation device 1020.

In some implementations, data storage device 1016 can include a non-transitory computer-readable storage medium 1024 on which can store instructions 1026 encoding any one or more of the methods or functions described herein, including components of FSS 145 and/or anonymizer 150 of FIG. 1 (e.g., decrypter 152, sanitizer 154, normalizer 156, etc.) and for implementing methods described herein.

Instructions 1026 can also reside, completely or partially, within volatile memory 1004 and/or within processing device 1002 during execution thereof by computer system 1000, hence, volatile memory 1004 and processing device 1002 can also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving, by a processor of a first computing system, a request for manufacturing process data;
   responsive to receiving access to a database management system, decrypting the database management system using a first cryptographic key controlled by a first entity and a second cryptographic key controlled by a second entity;
   obtaining, from a data store, using the database management system, the manufacturing process data, wherein the manufacturing process data is encrypted; and sending the encrypted manufacturing process data to a second computing system configured to decrypt the encrypted manufacturing process data and to perform one or more anonymization operations on the decrypted manufacturing process data.

2. The method of claim 1, wherein the encrypted manufacturing process data is decrypted using a cryptographic key stored by the second computing system.

3. The method of claim 2, wherein a processor of the second computing system is operable to perform the one or more anonymization operations on the decrypted manufacturing process data.

4. The method of claim 2, wherein a processor of the second computing system is operable to perform one or more normalization operations on the decrypted manufacturing process data.

5. The method of claim 1, wherein a processor of the second computing system is operable to send anonymized manufacturing process data to a requesting application.

6. The method of claim 1, further comprising:
receiving, by the processor of the first computing system, anonymized manufacturing process data, wherein the anonymized manufacturing process data is encrypted; and
decrypting the encrypted anonymized manufacturing process data.

7. The method of claim 1, wherein the one or more anonymization operations are performed in a privacy enhanced environment.

8. The method of claim 2, wherein the second computing system and the cryptographic key are managed by a third entity.

9. The method of claim 1, wherein the manufacturing process data is encrypted by the processor using a public key of a public-private key pair, wherein a private key of the public-private key pair is managed by the second computing system.

10. The method of claim 1, wherein the request for the manufacturing process data is issued by at least one of an application hosted on the first computing system or an application hosted on a third computing system.

11. The method of claim 1, further comprising:
sending, to the second computer system, an executable of at least one of an application component or an application associated with the one or more anonymization operations.

12. The method of claim 11, wherein the executable of the at least one of the application component or the application is encrypted.

13. The method of claim 1, wherein a processor of the second computing system is operable to receive additional data from a third computing system to perform one or more additional anonymization operations on the additional data.

14. The method of claim 1, further comprising:
decrypting the database management system using the first cryptographic key and the second cryptographic key.

15. A method, comprising:
receiving, by a processor of a first computing system, first encrypted data from a second computing system, wherein the first encrypted data is received via a database management system associated with the second computing system that is decrypted using a first cryptographic key controlled by a first entity and a second cryptographic key controlled by a second entity;
receiving second encrypted data from a third computing system;
obtaining first decrypted data by decrypting, using a first key, the first encrypted data, wherein the first key is part of a first public-private key pair managed by the second computing system;
obtaining second decrypted data by decrypting, using a second key, the second encrypted data, wherein the second key is part of a second public-private key pair managed by the third computing system;
obtaining output data by performing one or more anonymization operations with respect to the first decrypted data and the second decrypted data;
encrypting the output data using a third key; and
sending the encrypted output data to at least one of the second computing system or the third computing system.

16. The method of claim 15, wherein the one or more anonymization operations are performed in a privacy enhanced environment.

17. The method of claim 15, further comprising:
receiving, from the second computing system, at least one of an application component or an application associated with the one or more anonymization operations.

18. The method of claim 15, wherein the second computing system is managed by a first entity and the third computing system is managed by a second entity.

19. The method of claim 15, wherein an anonymization operation of the one or more anonymization operations comprises at least one of a sanitize operation or a normalization operation.

20. A computing system, comprising:
a data store;
a database management system configured to manage data on the data store, wherein the database management system is encrypted using a first cryptographic key controlled by a first entity and a second cryptographic key controlled by a second entity; and
a processing device, operatively coupled to the data store and the database management system, to perform operations comprising:
receiving a request for manufacturing process data;
responsive to receiving access to the database management system, decrypting the database management system using the first cryptographic key and the second cryptographic key;
obtaining, from a data store, using the database management system, the manufacturing process data, wherein the manufacturing process data is encrypted; and
sending the encrypted manufacturing process data to a second computing system configured to decrypt the encrypted manufacturing process data and to perform one or more anonymization operations on the decrypted manufacturing process data.

* * * * *